(12) United States Patent
Kim et al.

(10) Patent No.: US 11,458,954 B2
(45) Date of Patent: Oct. 4, 2022

(54) DEVICE AND METHOD FOR CONTROLLING WHEEL SLIP OF VEHICLE

(71) Applicants: HYUNDAI MOTOR COMPANY, Seoul (KR); KIA MOTORS CORPORATION, Seoul (KR)

(72) Inventors: Hyun Su Kim, Uiwang-si (KR); Chung Hee Han, Bucheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/929,469

(22) Filed: Jul. 15, 2020

(65) Prior Publication Data
US 2021/0276538 A1 Sep. 9, 2021

(30) Foreign Application Priority Data
Mar. 9, 2020 (KR) ........................ 10-2020-0029061

(51) Int. Cl.
*B60W 30/02* (2012.01)
*B60W 10/184* (2012.01)
*B60W 40/10* (2012.01)

(52) U.S. Cl.
CPC .......... *B60W 30/02* (2013.01); *B60W 10/184* (2013.01); *B60W 40/10* (2013.01); *B60W 2510/22* (2013.01); *B60W 2520/26* (2013.01)

(58) Field of Classification Search
CPC .... B60W 30/02; B60W 10/184; B60W 40/10; B60W 2510/22; B60W 2520/26
See application file for complete search history.

(56) References Cited

U.S. PATENT DOCUMENTS

| | | | |
|---|---|---|---|
| 6,321,155 B1* | 11/2001 | Fischer | B60T 8/48 180/902 |
| 8,639,402 B2* | 1/2014 | Tate | B60L 50/61 701/84 |
| 9,128,816 B2 | 9/2015 | Nihei et al. | |
| 9,278,693 B2* | 3/2016 | Perkins | B60W 30/18172 |
| 9,676,390 B2* | 6/2017 | Fairgrieve | B60W 10/184 |
| 10,589,738 B1* | 3/2020 | Boecker | B60W 10/18 |
| 10,597,070 B2* | 3/2020 | De Carteret | B62D 15/025 |
| 10,723,229 B1* | 7/2020 | Yao | B60L 7/10 |
| 2006/0012245 A1* | 1/2006 | Post, II | B60T 8/1837 303/154 |
| 2009/0204292 A1* | 8/2009 | Tate | B60T 8/175 701/41 |
| 2010/0145574 A1* | 6/2010 | Mattson | B60T 8/17554 701/38 |
| 2018/0029577 A1* | 2/2018 | Beauvais | B60T 7/06 |
| 2018/0141528 A1* | 5/2018 | Oh | B60W 10/184 |
| 2019/0263210 A1* | 8/2019 | Nasu | B60G 17/018 |

(Continued)

*Primary Examiner* — Jonathan M Dager
(74) *Attorney, Agent, or Firm* — Morgan, Lewis & Bockius LLP

(57) ABSTRACT

A device for controlling wheel slip of a vehicle includes: a displacement sensor for measuring a suspension displacement of drive wheels; and a controller configured to control braking of the drive wheels in consideration of the suspension displacement of the drive wheels when slip occurs on the drive wheels. The device may control braking of a slip-occurred wheel in consideration of a displacement of a suspension corresponding to the slip-occurred wheel of the vehicle.

13 Claims, 7 Drawing Sheets

(56) References Cited

U.S. PATENT DOCUMENTS

| | | | |
|---|---|---|---|
| 2020/0023852 A1* | 1/2020 | Yi | B60W 40/076 |
| 2021/0171004 A1* | 6/2021 | Han | G06N 3/0445 |
| 2021/0197778 A1* | 7/2021 | Shi | B60T 8/1761 |
| 2022/0063365 A1* | 3/2022 | Chetty | B60W 10/22 |

* cited by examiner

DEVICE AND METHOD FOR CONTROLLING WHEEL SLIP OF VEHICLE

CROSS-REFERENCE TO RELATED APPLICATION

This application claims the benefit of priority to Korean Patent Application No. 10-2020-0029061, filed in the Korean Intellectual Property Office on Mar. 9, 2020, the entire contents of which are incorporated herein by reference.

TECHNICAL FIELD

The present disclosure relates to a technique for effectively controlling wheel braking of a Traction Control System (TCS) when slip occurs on a wheel of a vehicle.

BACKGROUND

In general, a TCS mounted on a vehicle is a system for controlling a driving force of the vehicle such that slip does not occur on a wheel when the vehicle departs or accelerates on a road surface with a low friction between the wheel (a tire) and a ground, such as a snowy road, a rainy road, and the like.

Such a TCS applies a braking force to a wheel on which the slip has occurred (hereinafter, a slip-occurred wheel), so that the driving force transmitted to the slip-occurred wheel is transmitted to a wheel on which the slip has not occurred, thereby not only reducing a driving force loss but also preventing the slip of the wheel on a slippery road.

A conventional TCS does not take into account a displacement of a suspension corresponding to the slip-occurred wheel when calculating an allowable slip ratio that is the basis for braking the slip-occurred wheel of the vehicle or releasing braking of the slip-occurred wheel.

Therefore, the conventional TCS is not able to prevent the driving force loss on a bumpy road surface (an uneven terrain) from which a wheel at one side of the vehicle may float in the air during traveling, and is not able to escape the vehicle from the bumpy road.

The contents described in the background are written to improve understanding of the background of the present disclosure, which may include contents that are not known to those skilled in the art to which this technology belongs.

SUMMARY

The present disclosure has been made to solve the above-mentioned problems occurring in the prior art while advantages achieved by the prior art are maintained intact.

An aspect of the present disclosure provides a device and a method for controlling wheel slip of a vehicle that may control braking of a slip-occurred wheel in consideration of a displacement of a suspension corresponding to the slip-occurred wheel of the vehicle, thereby preventing a driving force loss on a bumpy road surface (an uneven terrain) and escaping the vehicle from the bumpy road surface.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling wheel slip of a vehicle includes: a displacement sensor for measuring a suspension displacement of drive wheels; and a controller that controls braking of the drive wheels in consideration of the suspension displacement of the drive wheels when slip occurs on the drive wheels.

The controller may control the braking of the drive wheels using a larger value among a left suspension displacement and a right suspension displacement of the drive wheels.

The controller may control the braking of the drive wheels based on a slip ratio of the drive wheels, an expected slip ratio of the drive wheels, a tuning value of the expected slip ratio, and an adjustment factor of the tuning value.

The controller may activate a braking mode of the drive wheels when a slip ratio of the drive wheels is greater than a value obtained by adding a tuning value to an expected slip ratio of the drive wheels and then subtracting an adjustment factor of the tuning value. In this connection, the adjustment factor of the tuning value, which varies based on the displacement of the suspension, may increase as the displacement of the suspension increases.

The controller may perform PI control based on an error calculated using a slip ratio of the drive wheels, an expected slip ratio of the drive wheels, a tuning value of the expected slip ratio, and an adjustment factor of the tuning value.

The controller may calculate, as an error, a difference between a slip ratio of the drive wheels and a value obtained by adding a tuning value to an expected slip ratio of the drive wheels and then subtracting an adjustment factor of the tuning value, and perform PI control based on the calculated error.

The controller may deactivate a braking mode of the drive wheels when a slip ratio of the drive wheels is not greater than a value obtained by adding a tuning value to an expected slip ratio of the drive wheels and then subtracting an adjustment factor of the tuning value.

The controller may maintain a braking mode of the drive wheels when a speed of the vehicle is maintained for or over a reference time at a speed equal to or below a reference speed, when a speed of a wheel on which the slip has not occurred is equal to or below a reference speed, or when a suspension displacement of a slip-occurred wheel of the drive wheels is maintained for or over a reference time at a value equal to or greater than a reference value while a slip ratio of the drive wheels is not greater than a value obtained by adding a tuning value to an expected slip ratio of the drive wheels and then subtracting an adjustment factor of the tuning value.

According to another aspect of the present disclosure, a method for controlling wheel slip of a vehicle includes: measuring a suspension displacement of drive wheels; and controlling braking of the drive wheels in consideration of the suspension displacement of the drive wheels when slip occurs on the drive wheels.

The controlling of the braking of the drive wheels may include selecting a larger value among a left suspension displacement and a right suspension displacement of the drive wheels.

The controlling of the braking of the drive wheels may include: performing a first calculation of adding a tuning value to an expected slip ratio of the drive wheels and then subtracting an adjustment factor of the tuning value, activating a braking mode of the drive wheels when a slip ratio of the drive wheels is greater than the result of the first calculation, performing a second calculation of adding the tuning value to the expected slip ratio of the drive wheels and then subtracting the adjustment factor of the tuning value after activating the braking mode of the drive wheels, and maintaining the braking mode of the drive wheels when a speed of the vehicle is maintained for or over a reference time at a speed equal to or below a reference speed, when a speed of a wheel on which the slip has not occurred is equal to or below a reference speed, or when a suspension displacement of a slip-occurred wheel of the drive wheels is maintained for or over a reference time at a value equal to or greater than a reference value while the slip ratio of the drive wheels is not greater than the result of the second calculation. In this connection, the adjustment factor of the tuning value has a great value as the displacement of the suspension increases.

The controlling of the braking of the drive wheels may include: performing a calculation of adding a tuning value to an expected slip ratio of the drive wheels and then subtracting an adjustment factor of the tuning value, calculating a difference between a calculation result and a slip ratio of the drive wheels as an error, and performing PI control based on the calculated error.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
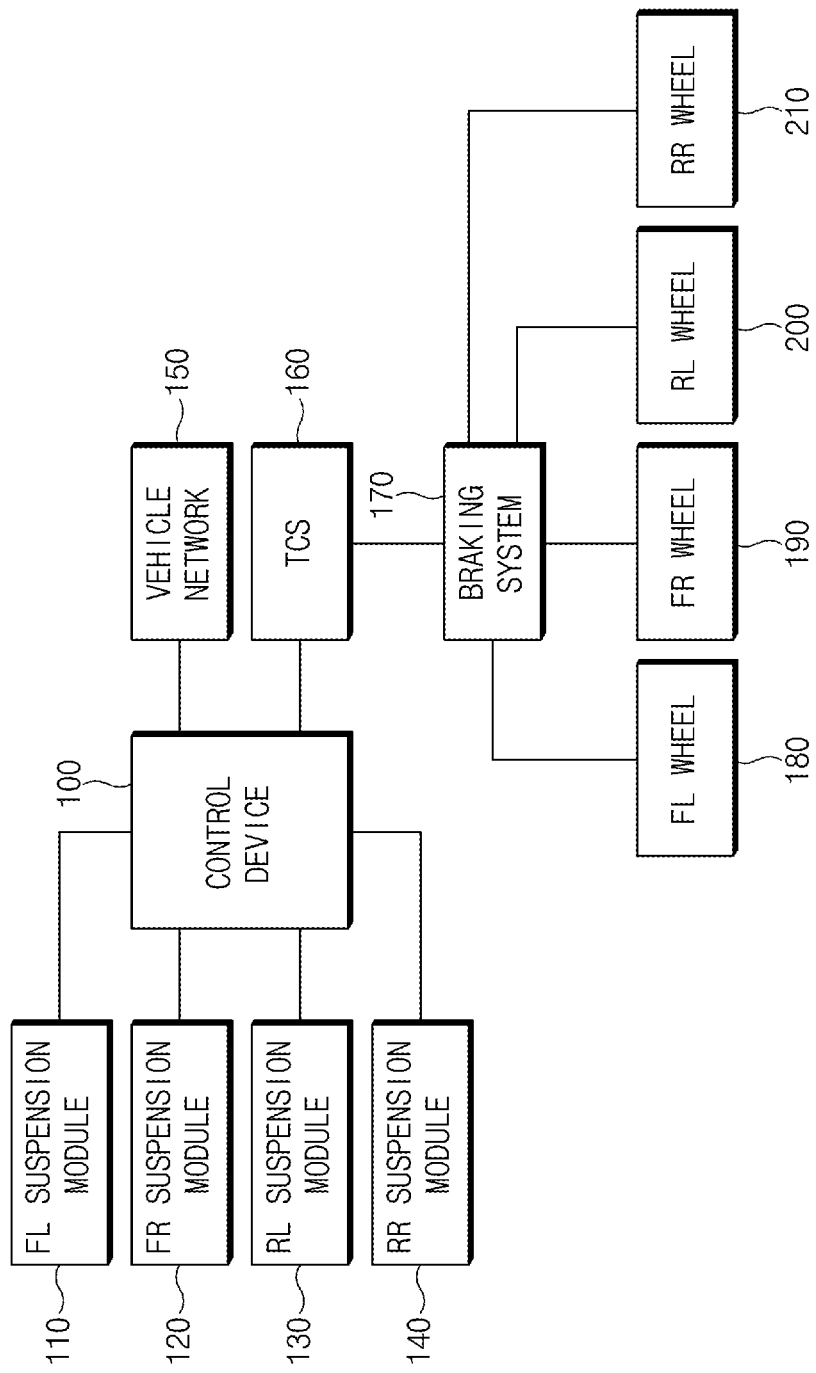
FIG. 1 is an exemplary view showing a configuration of a vehicle to which a device for controlling wheel slip of a vehicle according to an exemplary embodiment of the present disclosure is applied.

Hereinafter, exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is an exemplary view showing a configuration of a vehicle to which a device for controlling wheel slip of a vehicle according to an exemplary embodiment of the present disclosure is applied.

As shown in FIG. 1, a vehicle to which a device 100 for controlling wheel slip of a vehicle according to an exemplary embodiment of the present disclosure is applied may include a FL (Front Left) suspension module 110, a FR (Front Right) suspension module 120, a RL (Rear Left) suspension module 130, a RR (Rear Right) suspension module 140, a vehicle network 150, a TCS (Traction Control System) 160, a braking system 170, a FL wheel 180, a FR wheel 190, a RL wheel 200, and a RR wheel 210.

The components 110 to 210 arranged in the vehicle are generally well-known components used in the present disclosure. Functions of the components will be briefly described below, but are not limited thereto.

The FL suspension module 110 is mounted on a left front wheel of the vehicle to perform a function of absorbing a shock such that a shock of a road surface is not transmitted to a vehicle body or a passenger.

The FR suspension module 120 is mounted on a right front wheel of the vehicle to perform the function of absorbing the shock such that the shock of the road surface is not transmitted to the vehicle body or the passenger.

The RL suspension module 130 is mounted on a left rear wheel of the vehicle to perform the function of absorbing the shock such that the shock of the road surface is not transmitted to the vehicle body or the passenger.

The RR suspension module 140 is mounted on a right rear wheel of the vehicle to perform the function of absorbing the shock such that the shock of the road surface is not transmitted to the vehicle body or the passenger.

The vehicle network 150, which is information (data) used to estimate a vehicle speed, performs a function of providing a wheel speed (a speed of each wheel), a yaw rate, a steering angle, and the like of the vehicle.

Such vehicle network may include a CAN (Controller Area Network), a LIN (Local Interconnect Network), a FlexRay, a MOST (Media Oriented Systems Transport), an Ethernet, and the like.

The TCS 160 performs a function of controlling a driving force of the vehicle such that slip does not occur on a wheel when the vehicle departs or accelerates on a road surface with a low friction between the wheel (a tire) and a ground, such as a snowy road, a rainy road, and the like.

Such TCS 160 performs a function of controlling braking of a slip-occurred wheel under control of the control device 100 to prevent a driving force loss on a bumpy road surface (an uneven terrain) and escaping the vehicle from the bumpy road surface.

For reference, the TCS 160 may include a BTCS (Brake Traction Control System) that controls the driving force of the vehicle through brake interference and a FTCS (Full Traction Control System) that controls the driving force of the vehicle through engine interference as well as the brake interference.

The braking system 170 may be implemented as an electro-hydraulic system, and may include a hydraulic pressure pump including a suction valve and a delivery valve, an inlet valve, an outlet valve, and a check valve including a hydraulic pressure switching valve and a pressure limiting valve.

Such braking system 170 may selectively brake the FL wheel 180, the FR wheel 190, the RL wheel 200, and the RR wheel 210.

The control device 100, which is a component according to an exemplary embodiment of the present disclosure, may control the braking of the slip-occurred wheel in consideration of a displacement of a suspension corresponding to the slip-occurred wheel of the vehicle to not only prevent the driving force loss on the bumpy road surface (the uneven terrain), but also escape the vehicle from the bumpy road surface.

In an exemplary embodiment of the present disclosure, the example in which the control device 100 is implemented as a separate component has been described. However, the control device 100 may be implemented such that the function of the control device 100 is performed by a controller of an ESC (Electronic Stability Control) system mounted in the vehicle.

Hereinafter, a detailed configuration of the control device 100 according to an exemplary embodiment of the present disclosure will be described with reference to FIG. 2.

Figure 2:
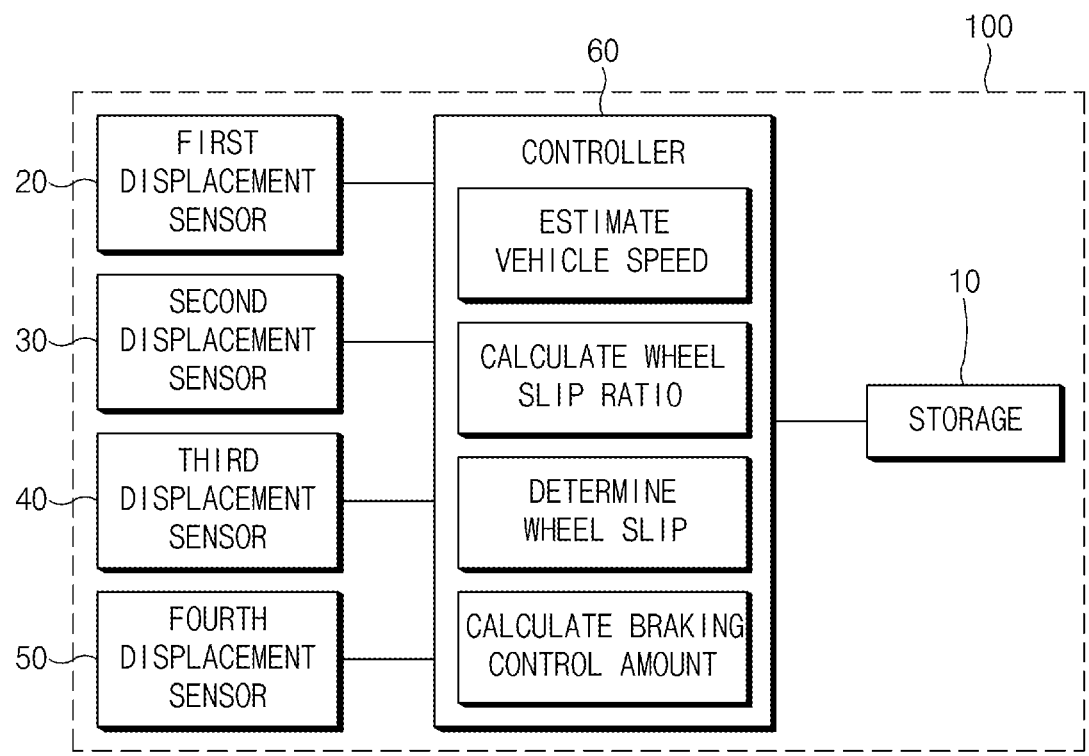
FIG. 2 is a block diagram of a device for controlling wheel slip of a vehicle according to an exemplary embodiment of the present disclosure.

FIG. 2 is a block diagram of a device for controlling wheel slip of a vehicle according to an exemplary embodiment of the present disclosure.

As shown in FIG. 2, the device 100 for controlling the wheel slip of the vehicle according to an exemplary embodiment of the present disclosure may include storage 10, a first displacement sensor 20, a second displacement sensor 30, a third displacement sensor 40, a fourth displacement sensor 50, and a controller 60. In this connection, the components may be combined with each other and implemented as one component or some components may be omitted based on a scheme of implementing the device 100 for controlling the wheel slip of the vehicle according to an exemplary embodiment of the present disclosure.

In a description of each of the components, firstly, the storage 10 may store various logics, algorithms, and programs required in the process of controlling the braking of the slip-occurred wheel in consideration of the displacement of the suspension corresponding to the slip-occurred wheel of the vehicle.

The storage 10 may store, as specification information of the vehicle, a rear tread indicating a distance between a central point of the left rear wheel and a central point of the right rear wheel, a front tread indicating a distance between a central point of the left front wheel and a central point of the right front wheel, a distance $L_f$ between a center of gravity of the vehicle and a front wheel axis, a distance $L_r$ between the center of gravity of the vehicle and a rear-wheel axis, and information on drive wheels (front-wheel drive, rear-wheel drive, four-wheel drive, and the like) to which the driving force is transmitted.

The storage 10 may store an algorithm (a mathematical equation) used to estimate the vehicle speed based on the speed of each wheel of the vehicle, the rear tread, the $L_f$, the yaw rate, and the steering angle of the vehicle.

The storage 10 may store an algorithm used to calculate a wheel slip ratio based on each wheel speed of the vehicle and the vehicle speed. In this connection, the storage 10 may store a wheel slip ratio calculation algorithm applied when the vehicle turns left, and a wheel slip ratio calculation algorithm applied when the vehicle turns right.

The storage 10 may store an algorithm used to calculate an expected speed of each wheel based on the vehicle speed, the rear tread, the $L_f$, the yaw rate, and the steering angle.

The storage 10 may store an algorithm used to calculate an expected wheel slip ratio based on the expected speed of each wheel of the vehicle and the vehicle speed. In this connection, the storage 10 may store an expected wheel slip ratio calculation algorithm applied when the vehicle turns left and an expected wheel slip ratio calculation algorithm applied when the vehicle turns right.

The storage 10 may store an algorithm that controls the braking of the wheel on which the slip has occurred based on a difference between a left wheel slip ratio and a right wheel slip ratio of the drive wheels (hereinafter, referred to as a slip ratio of the drive wheels), a difference between a left wheel expected slip ratio and a right wheel expected slip ratio of the drive wheels (hereinafter, referred to as an expected slip ratio of the drive wheels), a tuning value of the slip ratio of the drive wheels, and a value (a function) corresponding to the suspension displacement as an adjustment factor of the tuning value.

The storage 10 may store an algorithm used to calculate a braking control amount of the wheel on which the slip has occurred.

The storage 10 may store an algorithm used to determine that the vehicle has escaped from the bumpy road surface (the uneven terrain).

Such storage 10 may include at least one type of a storage medium of at least one type of memory such as a flash memory type, a hard disk type, a micro type, and a card type (e.g., an SD card (Secure Digital Card) or an XD card (eXtream Digital Card)), and the like, and a RAM (Random Access Memory), a SRAM (Static RAM), a ROM (Read Only Memory), a PROM (Programmable ROM), an EEPROM (Electrically Erasable PROM), a MRAM (Magnetic RAM), a magnetic disk, and an optical disk type memory.

Next, the first displacement sensor 20, which is a linear displacement sensor mounted on the FL suspension module 110, may measure a displacement of the FL suspension module 110. In this connection, the displacement of the FL suspension module 110 means a change in a compressed state of the FL suspension module 110 resulted from a weight of the vehicle. As an example, the first displacement sensor 20 may measure a displacement in a direction in which compression decreases based on a degree of compression (a compressed state) of the FL suspension module 110 in an unloaded state.

The second displacement sensor 30, which is a linear displacement sensor mounted on the FR suspension module 120, may measure a displacement of the FR suspension module 120. In this connection, the displacement of the FR suspension module 120 means a change in a compressed state of the FR suspension module 120 resulted from the weight of the vehicle. As an example, the second displacement sensor 30 may measure a displacement in a direction in which compression decreases based on a degree of compression (a compressed state) of the FR suspension module 120 in the unloaded state.

The third displacement sensor 40, which is a linear displacement sensor mounted on the RL suspension module 130, may measure a displacement of the RL suspension module 130. In this connection, the displacement of the RL suspension module 130 means a change in a compressed state of the RL suspension module 130 resulted from the weight of the vehicle. As an example, the third displacement sensor 40 may measure a displacement in a direction in which compression decreases based on a degree of compression (a compressed state) of the RL suspension module 130 in the unloaded state.

The fourth displacement sensor 50, which is a linear displacement sensor mounted on the RR suspension module 140, may measure a displacement of the RR suspension module 140. In this connection, the displacement of the RR suspension module 140 means a change in a compressed state of the RR suspension module 140 resulted from the weight of the vehicle. As an example, the fourth displacement sensor 50 may measure a displacement in a direction in which compression decreases based on a degree of compression (a compressed state) of the RR suspension module 140 in the unloaded state.

A reason for measuring the displacement in the direction in which the compression of the suspension is reduced is to determine a case in which the slip occurs because the weight of the vehicle is not loaded.

In an exemplary embodiment of the present disclosure, the structure in which each displacement sensor is connected to the controller 60 has been described, but the controller 60 may also be implemented in a form of obtaining the suspension displacement of each wheel from the vehicle network 150.

Figure 3:
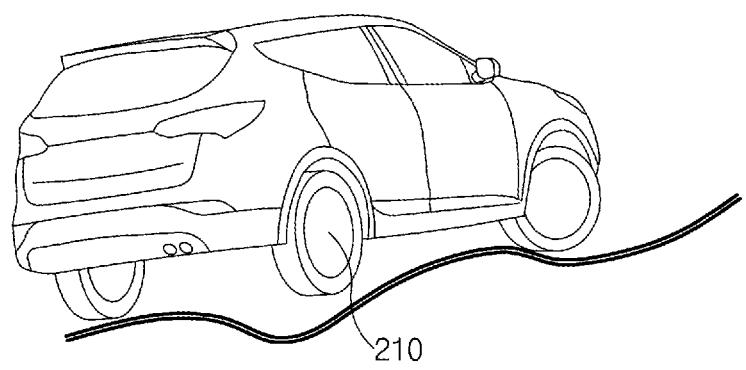
FIG. 3 is an exemplary view showing an external structure of a four-wheel drive vehicle to which a device for controlling wheel slip of a vehicle according to an exemplary embodiment of the present disclosure is applied.

FIG. 3 is an exemplary view showing an external structure of a four-wheel drive vehicle to which a device for controlling wheel slip of a vehicle according to an exemplary embodiment of the present disclosure is applied, which shows a state in which the RR wheel 210 is in air in a situation where the four-wheel drive vehicle is traveling on the bumpy road surface (the uneven terrain). In this connection, the weight of the vehicle is not loaded on the RR suspension module 140 corresponding to the RR wheel 210, so that the displacement of the suspension is maximized. When the weight of the vehicle is loaded as the RR wheel 210 is brought into contact with the road surface afterwards, the displacement of the suspension becomes minimal.

Next, the controller 60 performs overall control such that each component may normally perform a function thereof. Such controller 60 may be implemented in a form of hardware, in a form of software, or in a combination of the hardware and the software. The controller 60 may be implemented as a microprocessor, but may not be limited thereto.

In particular, the controller 60 may control the braking of the slip-occurred wheel in consideration of the displacement of the suspension corresponding to the slip-occurred wheel of the vehicle.

Hereinafter, operations of the controller 60 will be described in detail with reference to FIGS. 4 to 5.

Figure 4:
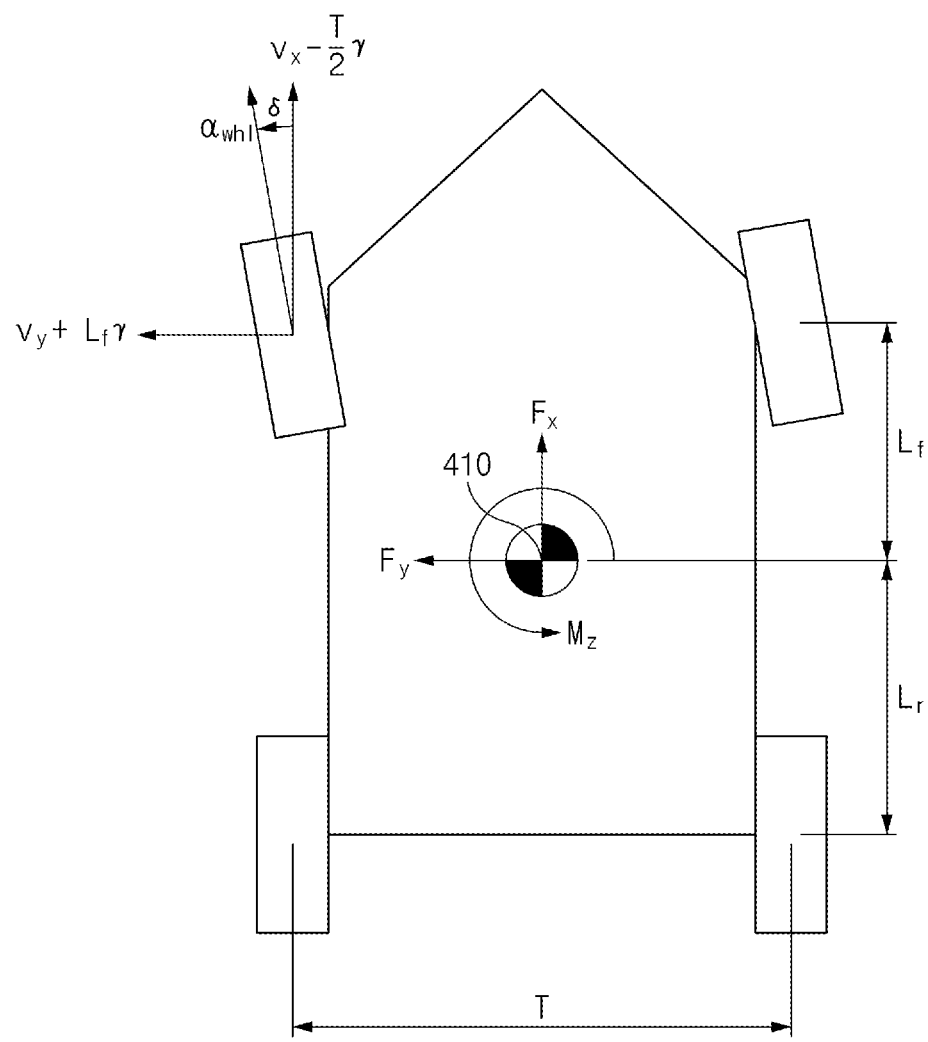
FIG. 4 is an exemplary view showing a process in which a controller disposed in a device for controlling wheel slip of a vehicle according to an exemplary embodiment of the present disclosure estimates a vehicle speed.

FIG. 4 is an exemplary view showing a process in which a controller disposed in a device for controlling wheel slip of a vehicle according to an exemplary embodiment of the present disclosure estimates a vehicle speed.

As shown in FIG. 4, the controller 60 disposed in the device for controlling the wheel slip of the vehicle according to an exemplary embodiment of the present disclosure may estimate a longitudinal speed $v_x$ of the vehicle based on the specification information of the vehicle stored in the storage 10 and vehicle information obtained through the vehicle network 150. For example, the controller 60 may estimate the longitudinal speed $v_x$ of the vehicle for each wheel based on a following [Mathematical equation 1].

[Mathematical equation 1]

$$v_x = \begin{cases} v_{whl,fl} + \dfrac{T}{2}\gamma - L_f\gamma\delta & \text{①} \\ v_{whl,fr} - \dfrac{T}{2}\gamma - L_f\gamma\delta & \text{②} \\ v_{whl,rl} + \dfrac{T}{2}\gamma & \text{③} \\ v_{whl,rr} - \dfrac{T}{2}\gamma & \text{④} \end{cases}$$

Here, $v_{whl,fl}$ means a speed of the FL wheel 180, $v_{whl,fr}$ means a speed of the FR wheel 190, $v_{whl,rl}$ means a speed of the RL wheel 200, $v_{whl,rr}$ means a speed of the RR wheel 210, γ means the yaw rate, δ means the steering angle, T means the rear tread indicating the distance between the central point of the left rear wheel and the central point of the right rear wheel, and $L_f$ means the distance between the center of gravity of the vehicle and the front wheel axis.

In addition, in the [Mathematical equation 1], ① is an equation that converts the speed of the FL wheel 180 into the vehicle speed $v_x$ at a center of gravity 410, ② is an equation that converts the speed of the FR wheel 190 into the vehicle speed $v_x$ at the center of gravity 410, ③ is an equation that converts the speed of the RL wheel 200 into the vehicle speed $v_x$ at the center of gravity 410, and ④ is an equation that converts the speed of the RR wheel 210 into the vehicle speed $v_x$ at the center of gravity 410.

In a case of a front-wheel drive vehicle, the controller 60 may estimate the vehicle speed $v_x$ calculated through the equation ③ as a final vehicle speed $V_{veh}$ estimate the vehicle speed $v_x$ calculated through the equation as the final vehicle speed $V_{veh}$, or estimate an average value of the vehicle speed $v_x$ calculated through the equation ③ and the vehicle speed $v_x$ calculated through the equation ④ as the final vehicle speed $V_{veh}$.

In a case of the four-wheel drive vehicle, the controller 60 may estimate, as the final vehicle speed $V_{veh}$, a maximum value among the vehicle speed $v_x$ calculated through equation ①, the vehicle speed $v_x$ calculated through equation ②, the vehicle speed $v_x$ calculated through equation ③, and the vehicle speed $v_x$ calculated through equation ④ when braking. The controller 60 may estimate, as the final vehicle speed $V_{veh}$, a minimum value among the vehicle speed $v_x$ calculated through equation ①, the vehicle speed $v_x$ calculated through equation ②, the vehicle speed $v_x$ calculated through equation ③, and the vehicle speed $v_x$ calculated through equation ④ when driving. In a case except the braking and driving, the controller 60 may estimate, as the final vehicle speed $V_{veh}$, an average value of the vehicle speed $v_x$ calculated through equation ①, the vehicle speed $v_x$ calculated through equation ②, the vehicle speed $v_x$ calculated through equation ③, and the vehicle speed $v_x$ calculated through equation ④.

For reference, the finally estimated vehicle speed $V_{veh}$ may be set to have a value equal to or greater than zero (0).

The controller 60 may calculate a slip ratio $\rho_{whl,i}$ of each wheel of the vehicle based on a following [Mathematical equation 2]. In this connection, the following [Mathematical equation 2] is applied when the vehicle turns left. When the vehicle turns right, the [Mathematical equation 2] is applied by changing "$-V_{veh}$" to "$+V_{veh}$".

$$\rho_{whl\cdot i} = \left| \frac{V_{whl\cdot i} - V_{veh}}{V_{veh}} \right|$$ [Mathematical equation 2]

Here, $\rho_{whl,i}$ means the slip ratio of each of the FL wheel 180, the FR wheel 190, the RL wheel 200, and the RR wheel 210, and $V_{whl,i}$ means the speed of each of the FL wheel 180, the FR wheel 190, the RL wheel 200, and the RR wheel 210.

The controller 60 may calculate the difference between the slip ratio of the right wheel and the slip ratio of the left wheel for the drive wheels of the vehicle based on a following [Mathematical equation 3]. For example, when the drive wheels are the FL wheel 180 and the FR wheel 190 in a two-wheel drive vehicle, a difference between a slip ratio of the FL wheel 180 and a slip ratio of the FR wheel 190 may be calculated. In this connection, in the case of the four-wheel drive vehicle, a difference between a slip ratio of the RL wheel 200 and a slip ratio of the RR wheel 210 may be additionally calculated.

A following [Mathematical equation 3] may be applied when the vehicle turns left. When the vehicle turns right, the [Mathematical equation 3] is applied after changing "$-\rho_{whl.iL}$" to "$+\rho_{whl.iL}$".

$$\rho_{whl.Drv} = \rho_{whl.iR} - \rho_{whl.iL}$$ [Mathematical equation 3]

Here, $\rho_{whl.Drv}$ means the difference between the right wheel slip ratio and the left wheel slip ratio of the drive wheels (the slip ratio of the drive wheels), $\rho_{whl.iR}$ means the slip ratio of the right wheel of the drive wheels, and $\rho_{whl.iL}$ means the slip ratio of the left wheel of the drive wheels.

In one example, the controller 60 may calculate the expected speed of each wheel based on the vehicle speed $V_{veh}$. For example, the controller 60 may calculate the expected speed of each wheel based on a following [Mathematical equation 4].

$$\hat{v}_{whl,fl} = v_x - \frac{T}{2}\gamma + L_f\gamma\delta$$ [Mathematical equation 4]

$$\hat{v}_{whl,fr} = v_x + \frac{T}{2}\gamma + L_f\gamma\delta$$

$$\hat{v}_{whl,rl} = v_x - \frac{T}{2}\gamma$$

$$\hat{v}_{whl,rr} = v_x + \frac{T}{2}\gamma$$

Here, $\hat{v}_{whl,fl}$ means an expected speed of the FL wheel 180, $\hat{v}_{whl,fr}$ means an expected speed of the FR wheel 190, $\hat{v}_{whl,rl}$ means an expected speed of the RL wheel 200, and $\hat{v}_{whl,rr}$ means an expected speed of the RR wheel 210.

The controller 60 may calculate an expected slip ratio $\hat{\rho}_{whl,i}$ of each wheel of the vehicle based on a following [Mathematical equation 5]. In this connection, the following [Mathematical equation 5] is applied when the vehicle turns left. When the vehicle turns right, the [Mathematical equation 5] is applied by changing "$-V_{veh}$" to "$+V_{veh}$".

$$\hat{\rho}_{whl\cdot i} = \left| \frac{\hat{v}_{whl\cdot i} - V_{veh}}{V_{veh}} \right|$$ [Mathematical equation 5]

In this connection, $\hat{\rho}_{whl,i}$ means the expected slip ratio of each of the FL wheel 180, the FR wheel 190, the RL wheel 200, and the RR wheel 210, and $\hat{v}_{whl,i}$ means the expected speed of each of the FL wheel 180, the FR wheel 190, the RL wheel 200, and the RR wheel 210.

The controller 60 may calculate the difference between the expected slip ratio of the right wheel and the expected slip ratio of the left wheel (the expected slip ratio of the drive wheels) for the drive wheels based on a following [Mathematical equation 6]. For example, when the drive wheels are the FL wheel 180 and the wheel 190 in the two-wheel drive vehicle, a difference between an expected slip ratio of the FL wheel 180 and an expected slip ratio of the FR wheel 190 may be calculated. In this connection, in the case of the four-wheel drive vehicle, a difference between an expected slip ratio of the RL wheel 200 and an expected slip ratio of the RR wheel 210 may be additionally calculated.

In this connection, a following [Mathematical equation 6] may be applied when the vehicle turns left. When the vehicle turns right, the [Mathematical equation 6] is applied after changing "$-\hat{\rho}_{whl.iL}$" to "$+\hat{\rho}_{whl.iL}$".

$$\hat{\rho}_{whl.Drv} = \hat{\rho}_{whl.iR} - \hat{\rho}_{whl.iL}$$ [Mathematical equation 6]

Here, $\hat{\rho}_{whl.Drv}$ indicates the difference between the expected slip ratio of the right wheel and the expected slip ratio of the left wheel (the expected slip ratio of the drive wheels) of the drive wheels, $\hat{\rho}_{whl.iR}$ indicates the expected slip ratio of the right wheel of the drive wheels, and $\hat{\rho}_{whl.iL}$ indicates the expected slip ratio of the left wheel of the drive wheels.

In one example, the controller 60 may activate a mode (a braking mode) that controls the braking of the wheel on which the slip has occurred based on a following [Mathematical equation 7].

$$\hat{\rho}_{whl.Drv} + \alpha - \beta < \beta_{whl.Drv}$$ [Mathematical equation 7]

Here, a is a fixed value as a tuning value for preventing the controller 60 from activating the braking mode unnecessarily, and β is a value that varies based on the displacement of the suspension as a factor for adjusting a. In this connection, the suspension displacement means a suspension displacement of a wheel with a greater slip ratio among the drive wheels in the case of the two-wheel drive vehicle. In the case of the four-wheel drive vehicle, the suspension displacement is the same as in the two-wheel drive vehicle when the slip-occurred wheel is the front wheel, and means a suspension displacement of a wheel with a greater slip ratio among the rear wheels when the slip-occurred wheel is the rear wheel.

Further, a relationship between the β value and the displacement of the suspension may be expressed in a form of a function. The function may be a function ($\beta=f(X_{whl.slip})$, $X_{whl.slip}$ is the displacement of the suspension) in a form in which the β value increases when the displacement of the suspension increases. In addition, a relationship between the α value and the β value is as shown in FIG. 5.

Figure 5:
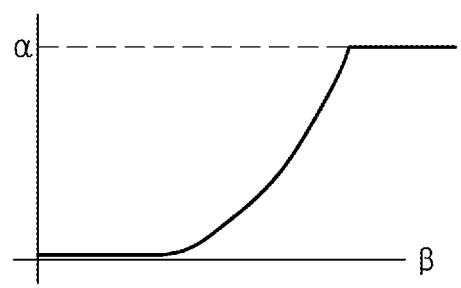
FIG. 5 is an exemplary view showing a relationship between factors used by a controller disposed in a device for controlling wheel slip of a vehicle according to an exemplary embodiment of the present disclosure to control braking of a slip-occurred wheel.

FIG. 5 is an exemplary view showing a relationship between factors used by a controller disposed in a device for controlling wheel slip of a vehicle according to an exemplary embodiment of the present disclosure to control braking of a slip-occurred wheel.

In FIG. 5, a vertical axis represents the tuning value α and a horizontal axis represents the adjustment factor β. In this connection, the β value is not able to exceed the α value.

The controller 60 is able to react sensitively to the displacement of the suspension by adding α and β in the control of the braking of the slip-occurred wheel. That is, the greater the displacement of the suspension, the faster the controller 60 may activate the braking mode of the slip-occurred wheel.

The controller 60 may calculate the braking control amount using a PI (Proportional Integral) control logic. For example, the controller 60 may calculate a braking control amount $P_{brake}$ based on a following [Mathematical equation 8].

$$e_p = \rho_{whl.Drv}(\rho_{whl.Drv} + \alpha - \beta)$$

$$P_{brake} = K_P e_p + K_I e_p \quad \text{[Mathematical equation 8]}$$

Here, ep means an error, $K_P$ means a proportional constant in the PI control logic, and $K_I$ means an integration constant in the PI control logic.

It is preferable that the controller 60 does not unconditionally release the braking of the slip-occurred wheel just because the [Mathematical equation 7] is not satisfied. This is because, for example, without being able to escape from the bumpy terrain, the vehicle may repeat at the same place a process in which the wheel (the tire) is on the ground and then in the air.

Therefore, the controller 60 may not deactivate but maintain the braking control mode of the slip-occurred wheel when one of following conditions are satisfied even when the above [Mathematical equation 7] is not satisfied.

1. When the estimated vehicle speed $V_{veh}$ is maintained for or over a reference time (e.g., 5 seconds) at a speed equal to or below a reference speed (e.g., 2KPH).
2. When a speed of a wheel on which the slip has not occurred is equal to or below a reference speed (e.g., 2KPH).
3. When the suspension displacement of the slip-occurred wheel as the drive wheel is maintained for or over a reference time at a value equal to or greater than a reference value.

Finally, the controller 60 may deactivate the braking control mode of the slip-occurred wheel when all the three conditions are not satisfied in the state in which the [Mathematical equation 7] is not satisfied.

Figure 6:
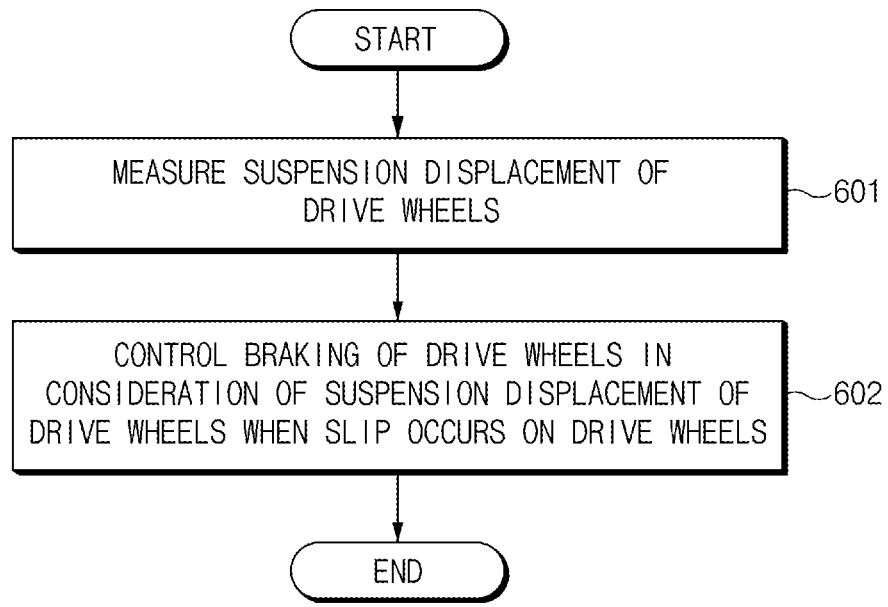
FIG. 6 is a flowchart of a method for controlling wheel slip of a vehicle according to an exemplary embodiment of the present disclosure.

FIG. 6 is a flowchart of a method for controlling wheel slip of a vehicle according to an exemplary embodiment of the present disclosure.

First, the displacement sensors 20 to 50 may measure the suspension displacement of the drive wheels (601). For example, when the drive wheels are the FL wheel 180 and the FR wheel 190, the first displacement sensor 20 may measure the suspension displacement of the FL wheel 180 and the second displacement sensor 30 may measure the suspension displacement of the FR wheel 190.

Thereafter, the controller 60 may control the braking of the drive wheels in consideration of the suspension displacement of the drive wheels when the slip occurs on the drive wheels (602). In this connection, the controller 60 may control the braking of the drive wheels by the TCS.

Figure 7:
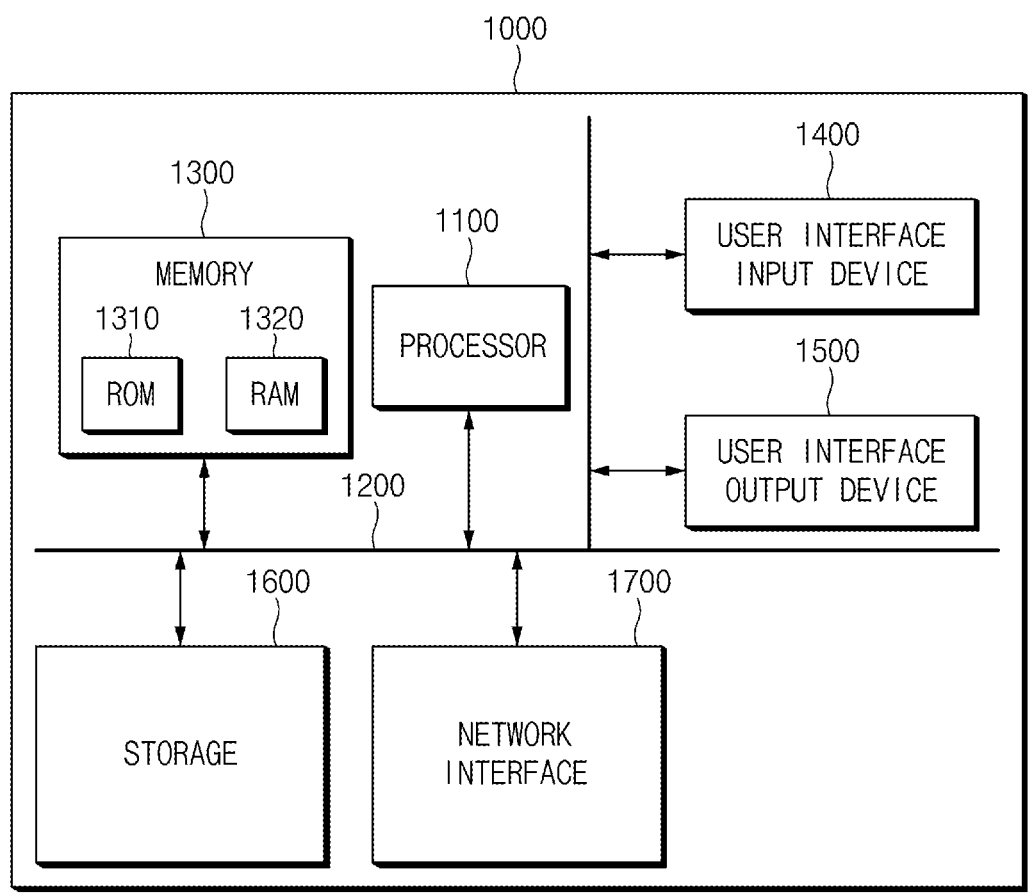
FIG. 7 is a computing system for implementing a method for controlling wheel slip of a vehicle according to an exemplary embodiment of the present disclosure.

FIG. 7 is a computing system for implementing a method for controlling wheel slip of a vehicle according to an exemplary embodiment of the present disclosure.

With reference to FIG. 7, the method for controlling the wheel slip of the vehicle according to an exemplary embodiment of the present disclosure described above may also be implemented via the computing system. A computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the exemplary embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a SSD (Solid State Drive), a removable disk, a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The device and the method for controlling the wheel slip of the vehicle according to an exemplary embodiment of the present disclosure may control the braking of the slip-occurred wheel in consideration of the displacement of the suspension corresponding to the slip-occurred wheel of the vehicle, thereby preventing the driving force loss on the bumpy road surface (the uneven terrain) and escaping the vehicle from the bumpy road surface.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling wheel slip of a vehicle, the device comprising:
    a displacement sensor for measuring a suspension displacement of drive wheels; and
    a controller configured to control braking of the drive wheels in consideration of the suspension displacement of the drive wheels when slip occurs on the drive wheels,
    wherein the controller is configured to activate a braking mode of the drive wheels when a slip ratio of the drive wheels is greater than a value obtained by adding a tuning value to an expected slip ratio of the drive wheels and then subtracting an adjustment factor of the tuning value.

2. The device of claim 1, wherein the controller is configured to control the braking of the drive wheels using a larger value among a left suspension displacement and a right suspension displacement of the drive wheels.

3. The device of claim 1, wherein the controller is configured to control the braking of the drive wheels based on the slip ratio of the drive wheels, the expected slip ratio of the drive wheels, the tuning value of the expected slip ratio, and the adjustment factor of the tuning value.

4. The device of claim 1, wherein the adjustment factor of the tuning value is a value varying based on the displacement of the suspension.

5. The device of claim 1, wherein the adjustment factor of the tuning value has a great value as the displacement of the suspension increases.

6. The device of claim 1, wherein the controller is configured to perform Proportional Integral (PI) control based on an error calculated using the slip ratio of the drive wheels, the expected slip ratio of the drive wheels, the tuning value of the expected slip ratio, and the adjustment factor of the tuning value.

7. The device of claim 1, wherein the controller is configured to:
calculate, as an error, a difference between the slip ratio of the drive wheels and a value obtained by adding the tuning value to the expected slip ratio of the drive wheels and then subtracting the adjustment factor of the tuning value, and
perform PI control based on the calculated error.

8. The device of claim 1, wherein the controller is configured to deactivate the braking mode of the drive wheels when the slip ratio of the drive wheels is not greater than a value obtained by adding the tuning value to the expected slip ratio of the drive wheels and then subtracting the adjustment factor of the tuning value.

9. The device of claim 1, wherein the controller is configured to maintain the braking mode of the drive wheels when a speed of the vehicle is maintained for or over a reference time at a speed equal to or below a reference speed, when a speed of a wheel on which the slip has not occurred is equal to or below a reference speed, or when a suspension displacement of a slip-occurred wheel of the drive wheels is maintained for or over a reference time at a value equal to or greater than a reference value while the slip ratio of the drive wheels is not greater than a value obtained by adding the tuning value to the expected slip ratio of the drive wheels and then subtracting the adjustment factor of the tuning value.

10. A method for controlling wheel slip of a vehicle, the method comprising:
measuring a suspension displacement of drive wheels; and
controlling braking of the drive wheels in consideration of the suspension displacement of the drive wheels when slip occurs on the drive wheels,
wherein the controlling braking of the drive wheels includes:
performing a first calculation of adding a tuning value to an expected slip ratio of the drive wheels and then subtracting an adjustment factor of the tuning value;
activating a braking mode of the drive wheels when a slip ratio of the drive wheels is greater than a result of the first calculation;
performing a second calculation of adding the tuning value to the expected slip ratio of the drive wheels and then subtracting the adjustment factor of the tuning value after activating the braking mode of the drive wheels; and
maintaining the braking mode of the drive wheels when a speed of the vehicle is maintained for or over a reference time at a speed equal to or below a reference speed, when a speed of a wheel on which the slip has not occurred is equal to or below a reference speed, or when a suspension displacement of a slip-occurred wheel of the drive wheels is maintained for or over a reference time at a value equal to or greater than a reference value while the slip ratio of the drive wheels is not greater than a result of the second calculation.

11. The method of claim 10, wherein the controlling braking of the drive wheels includes selecting a larger value among a left suspension displacement and a right suspension displacement of the drive wheels.

12. The method of claim 10, wherein the adjustment factor of the tuning value has a great value as the displacement of the suspension increases.

13. The method of claim 10, wherein the controlling braking of the drive wheels includes:
performing a calculation of adding the tuning value to the expected slip ratio of the drive wheels and then subtracting the adjustment factor of the tuning value;
calculating a difference between a calculation result and the slip ratio of the drive wheels as an error; and
performing PI control based on the calculated error.

* * * * *